UNITED STATES PATENT OFFICE.

CARLETON ELLIS, OF LARCHMONT, NEW YORK, ASSIGNOR TO CHADELOID CHEMICAL COMPANY, OF NEW YORK, N. Y., A CORPORATION OF WEST VIRGINIA.

FINISH-REMOVER.

1,145,980. Specification of Letters Patent. Patented July 13, 1915.

No Drawing. Application filed June 6, 1907. Serial No. 377,491.

*To all whom it may concern:*

Be it known that I, CARLETON ELLIS, a citizen of the United States, and resident of Larchmont, in the county of Westchester and State of New York, have made certain new and useful Inventions Relating to Finish-Removers, of which the following is a specification.

This invention relates to finish removers and relates especially to removers of a substantially non-inflammable character in which the volatile inflammable ingredients are so combined with non-inflammable bodies or solvents, such as chlorinated derivatives of acetylene as to be unobjectionable under ordinary conditions of use.

Acetylene chlorid, that is, the saturated chlorid of acetylene more properly termed tetrachlorethane $C_2H_2Cl_4$ is a very desirable solvent which is not only non-inflammable but suppresses the inflammability of many other volatile inflammable solvents, such as are used in removers, raising the flash point so that the remover is much more desirable under service conditions. Acetylene chlorid is also a good solvent for many waxes, resins and varnish gums and materially increases the solvent action of the remover. The acetylene tetrachlorid may be used in the form of chlorinated acetylene containing both the tetrachlorid and dichlorid of acetylene, the dichlorid being apparently still more efficacious in suppressing the inflammability of the more volatile inflammable ingredients of the remover. Many alcoholic bodies may be used in such removers, including methyl, ethyl, propyl, butyl and amyl alcohols, especially in their cheaper commercial forms, including denatured and commercial allyl alcohols, and alcoholic derivatives, such as amyl acetate and other ethers or esters; also other loosening finish solvent material, that is, solvents having a generally alcoholic character or action in removers, such as the higher ketones, including adipin ketone and methyl ethyl ketone are desirable. Other finish solvents may also be incorporated in removers of this character, such as terpineol and light oil of wood tar, and also solvents comprising pinene, such as light oil of camphor, which is produced commercially in large quantities, the solvent power of which may be considerably increased by properly fractionating so as to secure larger proportions of pinene in the solvents used.

Although not necessary in all cases, suitable stiffening material, preferably of a film-forming character, may be employed in these removers, including wood flour, fullers' earth, whiting, infusorial earth and film-forming stiffening material, such as paraffin, ceresin and other waxy and soapy materials and gums, such as benzoin and wax-like bodies produced by the combination of fats and oils with methyl and ethyl alcohols so as to form the esters of the fatty acids. The stiffening material when of a film-forming character is preferably thoroughly incorporated with the more energetic solvents therefor by agitation at a moderate heat, if desired, before incorporating the other ingredients, although this is not necessary in all cases. It is, of course, understood that in removers of this character only small proportions of the extremely volatile low boiling point ingredients, such as methyl alcohol or acetone, should be used where the minimum inflammability of the composition is desired. A suitable illustrative remover of this character may comprise acetylene tetrachlorid 40 parts, light oil of camphor 25 parts and denatured alcohol 35 parts with which 2 parts of ceresin or paraffin wax may be combined, if desired. Another illustrative remover may comprise acetylene tetrachlorid 35 parts, denatured alcohol 60 parts, ceresin wax 5 parts. Still another illustrative remover may comprise acetylene tetrachlorid 30 parts, light oil of wood tar 70 parts.

Having described this invention in connection with a number of illustrative ingredients and formulas, to the details of which disclosure the invention is not, of course to be limited, what is claimed is:—

1. The finish remover comprising approximately acetylene tetrachlorid 40 parts, light oil of camphor 25 parts, denatured alcohol 35 parts and ceresin wax 2 parts.

2. The finish remover comprising approximately acetylene tetrachlorid 40 parts, light oil of comphor 25 parts, and denatured alcohol 35 parts.

3. The finish remover comprising approximately acetylene tetrachlorid 40 parts and composite finish solvent material comprising loosening finish solvent material 60 parts.

4. The substantially non-inflammable finish remover comprising acetylene tetrachlorid, composite finish solvent material including loosening finish solvent material and evaporation-retarding stiffening material.

5. The substantially non-inflammable finish remover comprising acetylene tetrachlorid and composite finish solvent material including loosening finish solvent material.

6. The substantially non-inflammable finish remover comprising composite finish solvent material including loosening finish solvent material with which chlorinated acetylene has been incorporated to reduce inflammability.

7. The substantially non-inflammable finish remover comprising volatile finish solvent material with which chlorinated acetylene has been incorporated.

8. The substantially non-inflammable finish remover comprising volatile finish solvent material including denatured alcohol and chlorinated acetylene.

9. The substantially non-inflammable finish remover comprising volatile finish solvent material including denatured alcohol and oil of camphor and chlorinated acetylene.

10. The finish remover comprising finish solvent material including pinene, denatured alcohol and chlorinated acetylene.

11. The finish remover comprising composite finish solvent material including pinene, loosening finish solvent and chlorinated acetylene.

CARLETON ELLIS.

Witnesses:
 HARRY L. DUNCAN,
 JESSEIE B. KAY.